(12) United States Patent
Littmann et al.

(10) Patent No.: US 8,087,705 B2
(45) Date of Patent: Jan. 3, 2012

(54) SEALING BOLT

(75) Inventors: Francois Littmann, Cocquio Trevisago (IT); Piercarlo Tebaldi, Brebbia (IT); Marco Sironi, Laveno-Mombello (IT)

(73) Assignee: The European Union, represented by the European Commission (BE)

( * ) Notice: Subject to any disclaimer, the term of this patent is extended or adjusted under 35 U.S.C. 154(b) by 862 days.

(21) Appl. No.: 12/097,495

(22) PCT Filed: Dec. 11, 2006

(86) PCT No.: PCT/EP2006/069559
§ 371 (c)(1),
(2), (4) Date: Jun. 13, 2008

(87) PCT Pub. No.: WO2007/068676
PCT Pub. Date: Jun. 21, 2007

(65) Prior Publication Data
US 2008/0289376 A1    Nov. 27, 2008

(30) Foreign Application Priority Data

Dec. 13, 2005  (EP) .................................. 05112071

(51) Int. Cl.
*B65D 27/30*   (2006.01)
*B65D 55/00*   (2006.01)
(52) U.S. Cl. .................... 292/307 R; 292/251; 292/327; 292/329; 411/2
(58) Field of Classification Search .............. 411/2, 3, 411/5; 292/251, 307 R, 315, 327, 329, 331
See application file for complete search history.

(56) References Cited

U.S. PATENT DOCUMENTS

| 718,826 | A | * | 1/1903 | Dick et al. ...................... 285/80 |
| 4,686,874 | A | * | 8/1987 | McCauley et al. ............... 81/461 |
| 5,228,250 | A | * | 7/1993 | Kesselman ......................... 52/98 |
| 5,306,054 | A | * | 4/1994 | Georgopoulos .......... 292/307 R |
| 5,807,048 | A | | 9/1998 | D'Agraives et al. |
| 6,694,593 | B1 | | 2/2004 | Causse D'Agraives et al. |
| 6,791,465 | B2 | * | 9/2004 | Blagin et al. .................. 340/665 |
| 2002/0044063 | A1 | | 4/2002 | Blagin et al. |

OTHER PUBLICATIONS

International Search Report PCT/EP2006/069559 Dated Mar. 28, 2007.

* cited by examiner

*Primary Examiner* — Carlos Lugo
(74) *Attorney, Agent, or Firm* — Cantor Colburn LLP

(57) ABSTRACT

A sealing bolt for sealing a container lid to a body with a threaded bore includes a shaft, a head connected to a first shaft end, and a threaded second shaft end engaged with the bore to lock the lid between the head and the body. The bolt includes a security element with a breakable integrity element. The security element comprises a first part arranged at the second shaft end, connected to the shaft with a breakable integrity element therebetween. The first part has a first thread cooperating with the bore, and a second part between the first part and second shaft end includes, a second thread cooperating therewith. An entrainment device disposed between first and second parts such that when the shaft and first part rotate in a tightening direction, second part is entrained. When the shaft and first part rotate in a loosening direction, second part remains stationary.

9 Claims, 2 Drawing Sheets

SEALING BOLT

TECHNICAL FIELD OF THE INVENTION

The present invention relates to a sealing bolt for sealing a container lid to a container body.

BRIEF DESCRIPTION OF RELATED ART

The sealing of containers is often necessary for security reasons. Secure sealing of a container is of particular importance in case the container holds dangerous substances, such as for example fissile materials. It is further important to be able to easily identify the container and thereby its contents. Sealing devices, such as sealing bolts, are therefore often provided with identification elements. In an effort to increase security of the seal, such identification elements are often concealed and difficult to tamper with. Furthermore, in order to be able to verify whether or not the sealing device has been tampered with or broken, the sealing bolt is generally provided with a security element having a breakable integrity element that breaks when the sealing bolt is removed.

Depending on the contents of the container, it can be of great importance to be sure that the container has not been tampered with and that its content is still intact. If the identity of the sealing bolt does not match and/or if the integrity element is broken, it can be concluded that the sealing device, and possibly the contents of the container, has been tampered with.

A sealing bolt with a security element is e.g. disclosed in U.S. Pat. No. 5,807,048, wherein a breakable integrity element arranged between the bolt head and a bolt cover arranged on the bolt head. The bolt head and bolt cover are arranged in such a way that a rotation of the bolt cover in a tightening direction entrains the bolt head, and consequently the sealing bolt itself, in the tightening direction without breaking the integrity element. However, a rotation of the bolt cover in the loosening direction involves a rotation of the bolt cover with respect to the bolt head and the integrity element is broken. Once the integrity element has been broken, any removal of the sealing bolt or even attempt thereof can be detected. If the integrity element is intact, it can be concluded that the contents of the container has not been tampered with.

With such security elements there is however a potential vulnerability of a possible external attack in that it is, in some circumstances, possible to apply a torque directly to the sealing bolt in order to unscrew the latter. If there is no relative rotation between the bolt head and the bolt cover, the integrity element is not broken. It follows that, in some circumstances, it is possible to remove the sealing bolt without breaking the integrity element. Hence, the contents of the container might have been tampered with even though the integrity element is intact. This should of course be avoided.

There is hence a need for further improving the security of such sealing bolts.

BRIEF DESCRIPTION OF THE INVENTION

The invention provides a sealing bolt with an improved security element. Furthermore, the present invention proposes a sealing bolt for sealing a container lid to a container body with a threaded bore, the sealing bolt comprising a bolt shaft having a first shaft end and a threaded second shaft end opposite to the first shaft end, and a bolt head connected to the first shaft end, the threaded second shaft end cooperating with the threaded bore so as to allow the sealing bolt to lock the container lid between the bolt head and the container body, the sealing bolt further comprising a security element with a breakable integrity element for verifying the integrity of the sealing bolt. According to an important aspect of the invention, the security element comprises a first part arranged at the second shaft end of the bolt shaft, the first part being connected to the bolt shaft and comprising the breakable integrity element therebetween, the first part having a first thread cooperating with the threaded bore; a second part arranged between the first part and the second shaft end of the bolt shaft, the second part having a second thread cooperating with the threaded bore; and a first entrainment means arranged between the first and second parts. The first entrainment means is arranged in such a way that, upon rotation of the bolt shaft and the first part in a first direction, the second part is entrained in the first direction, and, upon rotation of the bolt shaft and the first part in a second direction, opposite to the first direction, the second part remains stationary.

During installation of the sealing bolt, a torque is applied to the bolt head, which results in the rotation of the bolt shaft and the first part in the first direction. Due to the first entrainment means, the second part is entrained in the first direction by the first part. The only parts of the sealing bolt, which can be accessible from outside, are the bolt head and possibly part of the bolt shaft. If an attempt is made to remove the sealing bolt, a torque in a second direction must be applied to either the bolt head or the bolt shaft. The first part, which is arranged deep inside the threaded bore, is thereby also rotated in the second direction. The second part is not entrained in rotation by the first part due to the configuration of the first entrainment means. Rotation of the sealing bolt in the second direction hence causes the first part to be rotated towards the second part, which remains stationary. This causes the first and second parts to come into contact with each other and form a tight connection. The first and second parts form a nut and lock-nut device deep inside the threaded bore. This nut and lock-nut device is not accessible from outside and cannot be tampered with. Further rotation of the bolt shaft, while the first part is locked in position by the second part, causes a relative rotation between the bolt shaft and the first part, which, in turn, causes the integrity element arranged therebetween to break.

The sealing bolt according to the present invention cannot be removed without breaking the integrity element. The security of the container is hence increased. With the present sealing bolt it can truly be concluded that, if the integrity element is not broken, the container has not been opened and its contents has not been tampered with.

Also, the bolt head does not have to comprise any means for receiving a bolt cover. The bolt head can hence be configured as a standard bolt head, which can have a torque applied to it by a standard tool as used for standard bolts. Furthermore, the bolt head of the sealing bolt can have the same appearance as a bolt head of a standard bolt, thereby making it more difficult to the potential intruder to identify, which of the bolts are sealing bolts with integrity elements.

According to a preferred embodiment of the invention, the first and second parts have two mating surfaces facing each other and the first entrainment means comprises a groove in one of the mating surfaces, the groove having a first end and a second end and being arranged on an annular path, wherein the depth of the groove gradually decreases in direction of the first end and abruptly decreases at the second end. A sliding pin is furthermore arranged in a bore of the other one of the mating surfaces, the sliding pin engaging the groove.

Such a first entrainment means allows the second part to be entrained in the first direction, but not in the second direction. As the bolt shaft is rotated in the first direction, the first part of the security element connected thereto is also rotated in the first direction. The sliding pin is displaced in the groove in direction of the second end. As the depth of the groove abruptly decreases at the second end, the sliding pin abuts the second end and entrains the second part. Hence, in the first direction, the second part is entrained by the first part. As the bolt shaft is rotated in the second direction, the first part of the security element connected thereto is also rotated in the second direction. The sliding pin is displaced in the groove in direction of the first end. As the depth of the groove gradually decreases in direction of the first end, the sliding pin is gradually pushed further into its bore and the second part is not entrained by the first part. Hence, as the bolt shaft is rotated in the second direction, the first part of the security element is rotated in the second direction while the second part remains stationary.

The sliding pin can be pushed into the groove by gravitational and/or spring force.

The sealing bolt preferably comprises second entrainment means between the second shaft end of the bolt shaft and the second part. Such second entrainment means is preferably configured so as to transmit rotational movement from the second shaft end to the second part, thereby allowing the second part to be removed from the threaded bore as the sealing bolt is removed. The second entrainment means should however ensure that the second part is only entrained once the integrity element has been broken.

According to an embodiment of the invention, the second entrainment means is formed by an axial cavity in the bolt shaft for receiving an axial extension of the second part, wherein the second shaft end comprises a first radial protrusion facing the axial extension of the second part; and the axial extension of the second part comprises a second radial protrusion facing the second shaft end. Furthermore, the first and second radial protrusions are arranged so as to engage each other after a predetermined rotation of the second shaft end with respect to the second part in the second direction. Such a second entrainment means allows the rotation of the bolt shaft without entraining the second part until the integrity element is broken. Once the bolt shaft has been rotated sufficiently to break the integrity element, the proof that the integrity of the sealing bolt has been violated has been established and the first and second parts of the security element can then be unblocked and removed from the threaded bore.

It will be understood that as an alternative, an axial cavity can be arranged in the second part for receiving an axial extension of the bolt shaft.

The sealing bolt advantageously further comprises at least one ultrasonic identity element. Alternatively, or in addition, the breakable integrity element can comprise such an ultrasonic identity element. Advantageously, the ultrasonic identity element comprises a stack of disks with randomly arranged notches. The random arrangement of the notches provides the stack of disks with a unique identification, which can easily be read with ultrasonic reading means.

The first direction is preferably a tightening direction of the sealing bolt and the second direction is preferably a loosening direction of the sealing bolt.

BRIEF DESCRIPTION OF THE DRAWINGS

The present invention will be more apparent from the following description of a not limiting embodiment with reference to the attached drawing, wherein.

DETAILED DESCRIPTION OF THE INVENTION

Figure 1:
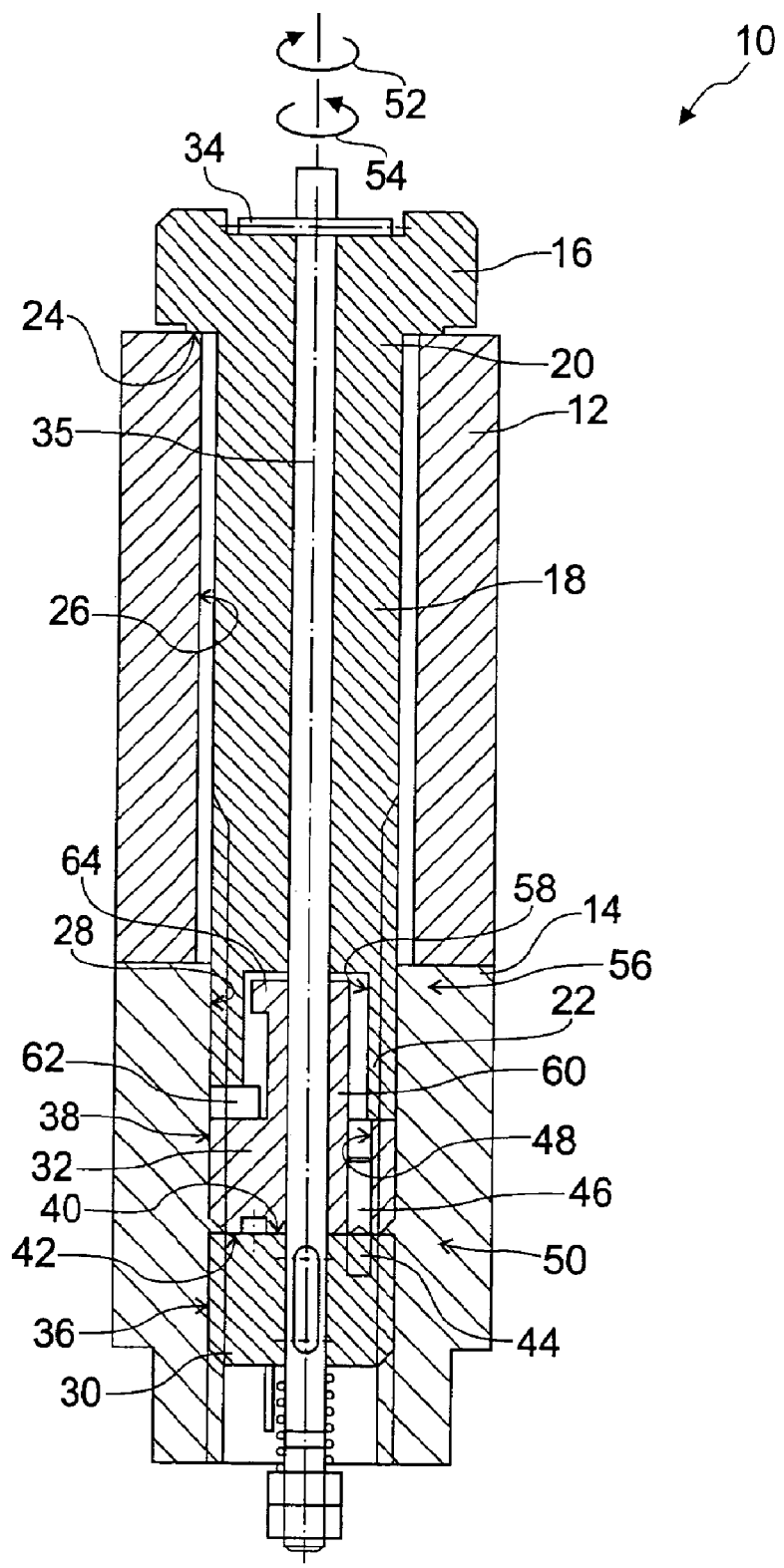
FIG. 1 shows a cut through an installed sealing bolt according to a first embodiment of the invention.

FIG. 1 shows a first embodiment of a sealing bolt 10 for sealing a container lid 12 to a container body 14 with a threaded bore. The sealing bolt 10 comprises a bolt head 16 and a bolt shaft 18 with a first shaft end 20 and a threaded second shaft end 22. The bolt head 16 is connected to the first shaft end 20 or it is preferably integrally formed in one piece therewith. The bolt head 16 comprises a radially protruding shoulder 24 for sandwiching the container lid 12 between the bolt head 16 and the container body 14.

The bolt shaft 18 extends through a first bore 26 in the container lid 12 and into a threaded second bore 28 in the container body 14. The threaded second shaft end 22 of the bolt shaft 18 cooperates with the threaded second bore 28 in the container body 14.

The sealing bolt 10 further comprises a security element with a breakable integrity element for verifying whether or not the sealing bolt 10 has been tempered with.

According to the present invention, such a security element comprises a first part 30 coaxially arranged at the second shaft end 22 of the bolt shaft 18 and a second part 32 coaxially arranged between the first part 30 and the second shaft end 22 of the bolt shaft 18.

The first part 30 is connected to the bolt shaft 18 and comprises a breakable integrity element 34 therebetween. The breakable integrity element 34 is arranged so as to break if the first part 30 is rotated with respect to the bolt shaft 18. According to the first embodiment, the breakable integrity element 34 is arranged in the bolt head 16 and is linked to the first part 30 via a coaxially arranged shank 35, which is rigidly fixed to the first part 30, such that rotation of the breakable integrity element 34 with respect to the first part 30 causes the breakable integrity element 34 to break.

The first and second parts 30, 32 have first and second threads 36, 38 respectively, each cooperating with the threaded second bore 28 in the container body 14.

The first and second parts 30, 32 have two mating surfaces 40, 42 facing each other.

One of the mating surfaces 40 comprises a groove 44, which is arranged on an annular path and has a first end wherein the depth of the groove 44 gradually decreases and a second end wherein the depth of the groove 44 abruptly decreases.

The other one of the mating surfaces 42 comprises a sliding pin 46 arranged in a bore 48 of that mating surface 42, wherein the sliding pin 46 is arranged so as to engage the groove 44.

The arrangement of the sliding pin 46 engaging the shaped groove 44 forms a first entrainment means 50 arranged between the first and second parts 30, 32.

As the bolt shaft 18 is rotated in a first direction, as indicated by arrow 52, which corresponds to a tightening direction of the sealing bolt 10, the sliding pin 46 abuts against the second end of the groove 44. As the depth of the groove 44 decreases abruptly at the second end of the groove 44, the sliding pin 46 abuts and pushes against the second end of the groove 44 and thereby entrains the second part 32 in rotation with the first part 30. Hence, upon rotation of the bolt shaft 18 and the first part 30 in the tightening direction 52, the second part 32 is entrained in the tightening direction 52.

As the bolt shaft 18 is rotated in a second direction, as indicated by arrow 54, which corresponds to a loosening direction of the sealing bolt 10, the sliding pin 46 is moved towards the first end of the groove 44. As the depth of the groove 44 decreases gradually in direction of the first end of the groove 44, the sliding pin 46 is pushed further into the bore 48 and does not entrain the second part 32 in rotation with the first part 30. Hence, upon rotation of the bolt shaft 18 and the first part 30 in the loosening direction 54, the second part 32 remains essentially stationary.

As the first part 30 is rotated in the loosening direction 54 and the second part 32 remains stationary, the two mating surfaces 40, 42 come into close contact as the second part 32 prevents the first part from being further rotated in the loosening direction 54. A tight connection is formed between the first and second parts 30, 32. This tight connection is formed deep inside the bore 26, 28 arranged in the container lid and body 12, 14, such that the tight connection is not accessible and can hence not be tampered with. Such a tight connection deep inside the bore 26, 28 receiving the sealing bolt 10 can also be referred to as "deep anchorage".

Once the first and second parts 30, 32 have formed a tight connection and the first part 30 and the shank 35 are prevented from being rotated any further in the loosening direction 54, any further rotation of the bolt shaft 18 in the loosening direction 54 increases the strain on the breakable integrity element 34. At a predefined torque force between the bolt shaft 18 and the first part 30, the breakable integrity element 34 arranged therebetween is broken. Only once the breakable integrity element 34 has been broken can the bolt shaft 18 be further rotated in the loosening direction 54. As the breakable integrity element 34 has been broken, it can be shown that the sealing bolt was removed, or at least that such an attempt was made. The integrity of the container and its contents can therefore be questioned. The security element of the sealing bolt is such that the sealing bolt cannot be removed without breaking the integrity element and hence leaving a trace of the removal.

In order to be able to remove the first and second parts 30, 32 from the bore 26, 28, the sealing bolt 10 comprises a second entrainment means 56 between the bolt shaft 18 and the second part 32.

Preferably, the second entrainment means 56 comprises an axial cavity 58 in the surface of the bolt shaft 18 facing the second part 32. Correspondingly, the second part 32 comprises an axial extension 60 in the surface of the second part 32 facing the bolt shaft 18. The axial extension 60 is dimensioned so as to be received in the axial cavity 58 with radial clearance.

The bolt shaft 18 comprises, in the axial cavity 58, a first radial protrusion 62 facing the axial extension 60 of said second part 32 and the axial extension 60 of the second part 32 comprises a second radial protrusion 64 facing the second shaft end 32. The first and second radial protrusions 62, 64 are arranged so as to fit in the radial clearance in the axial cavity 58 between the bolt shaft 18 and the axial extension 60.

The first and second radial protrusions 62, 64 are arranged so as to engage each other after a predetermined rotation of the bolt shaft 18 with respect to the first part 30, which must at least be sufficient to cause the breakable integrity element 34 to break before the first radial protrusion 62 engages the second radial protrusion 64.

Such a second entrainment means 56 allows the second part 32 to be entrained in the loosening direction 54 by the bolt shaft 18, thereby loosening the tight connection between the first and second parts 30, 32 and allowing the second part 32 to be removed from the bore 26, 28.

As an alternative design for the second entrainment means 56, it is clear that the bolt shaft can be provided with the radial protrusion and the second part can be provided with the axial cavity.

The sealing bolt 10 preferably further comprises at least one ultrasonic identity element arranged within the bolt head 16, either separately or within the breakable integrity element. Such an ultrasonic identity element can be formed by a stack of disks with randomly arranged notches. Such a stack of disks is formed by providing a plurality of disks, preferably of identical or at least similar diameter, providing the disks with notches, and stacking the disks in a random fashion such that the notches are arranged in a random angular position with respect to each other. The individual disks are then preferably welded together so as to maintain the angular position of the individual disks. The random arrangement of the notches provides the stack of disks with a unique identification. The identity of such an ultrasonic identity element can be read with ultrasonic reading means.

A second embodiment of the sealing bolt 10 for sealing a container lid 12 to a container body 14. As the second embodiment is very similar to the first one, the same reference numbers have been used. The description of the individual elements is not repeated. The second embodiment mainly differs from the first one in the location of the integrity element.

A breakable integrity element 34' is arranged between the first part 30 and the bolt shaft 18 and is configured to break if the first part 30 is rotated with respect to the bolt shaft 18. According to the second embodiment, the breakable integrity element 34' is, with one end, linked to the first part 30 via the coaxially arranged shank 35, which is rigidly fixed to the first part 30 and, with the other end, rigidly fixed to the bolt shaft 18. Consequently, rotation of the bolt shaft 18 with respect to the first part 30 causes the breakable integrity element 34' to break.

Figure 2:
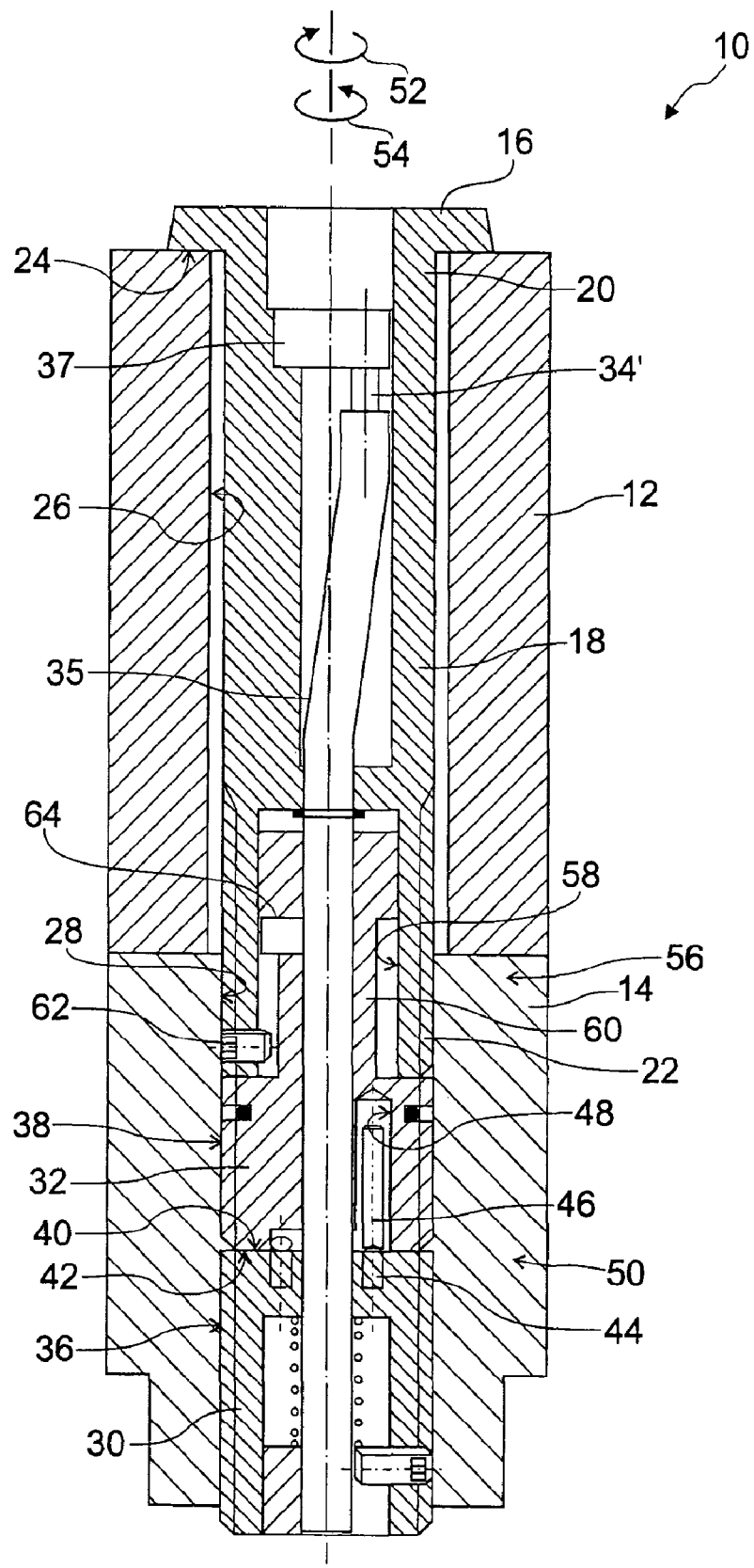
FIG. 2 shows a cut through an installed sealing bolt according to a second embodiment of the invention.

An ultrasonic identity element 37 is arranged in the bolt head 16. Such an ultrasonic identity element 37 can be read using ultrasonic reading means and provides a unique identification signal which can be used to identify the sealing bolt 10. The integrity element 34' is connected to the ultrasonic identity element 37. In the embodiment of FIG. 2, the integrity element 34' is represented in an off-centre arrangement with respect to the ultrasonic identity element 37 which is arranged coaxially with the sealing bolt 10. In order to connect the coaxially arranged shank 35 to the integrity element 34', the end of the shank 35 connected to the integrity element 34' is bent.

When the bolt shaft 18 is rotated with respect to the fixed first part 30, the shank 35 breaks the integrity element 34' which in turn locally changes the ultrasonic signal. If the ultrasonic signal has changed it can be concluded that the sealing bolt has been tampered with.

Preferably, the integrity element 34' is formed by a stack of disks with randomly arranged notches. Such a stack of disks is formed by providing a plurality of disks, preferably of identical or at least similar diameter, providing the disks with notches, and stacking the disks in a random fashion such that the notches are arranged in a random angular position with respect to each other. The individual disks are then preferably welded together so as to maintain the angular position of the individual disks. The random arrangement of the notches provides the stack of disks with a unique identification.

The integrity element 34' according to the second embodiment is arranged inside the first bore 26 of the bolt shaft 18 and is not accessible from the outside. It follows that the integrity element 34' itself is better protected and cannot be tampered with.

Advantageously, the ultrasonic reading is carried out over a larger area, i.e. an area not solely covering the integrity element 34' but also part of its surrounding area. By including the protruding shoulder 24 of the bolt head 16 in the ultrasonic reading area, a structural change in the bolt head 16, in the region of the protruding shoulder 24 can also be detected. Indeed, it is thereby possible to check if the bolt head 16 has been tampered with and detect an opening of the container by cutting the protruding shoulder 24 and lifting the container lid 12 over the sealing bolt 10 without rotating the bolt shaft 18.

The invention claimed is:

1. Sealing bolt for sealing a container lid to a container body with a threaded bore, said sealing bolt comprising a bolt shaft having a first shaft end and a threaded second shaft end opposite to said first shaft end, and a bolt head connected to said first shaft end, said threaded second shaft end cooperating with said threaded bore so as to allow said sealing bolt to lock said container lid between said bolt head and said container body, said sealing bolt further comprising a security element with a breakable integrity element for verifying the integrity of said sealing bolt, wherein said security element comprises:
   a first part arranged at said second shaft end of said bolt shaft, said first part being connected to said bolt shaft and said breakable integrity element via a coaxially arranged shank, said first part having a first thread cooperating with said threaded bore;
   a second part arranged between said first part and said second shaft end of said bolt shaft, said second part having a second thread cooperating with said threaded bore; and
   first entrainment means arranged between said first and second parts in such a way that:
      upon rotation of said bolt shaft and said first part in a tightening direction, said second part is entrained in said tightening direction, and
      upon rotation of said bolt shaft and said first part in a loosening direction, opposite to said tightening direction, said second part remains stationary.

2. Sealing bolt according to claim 1, wherein said first and second parts have two mating surfaces facing each other and said first entrainment means comprises:
   a groove in one of said mating surfaces, said groove having a first end and a second end and being arranged on an annular path, wherein the depth of said groove gradually decreases in direction of said first end and abruptly decreases at said second end; and
   a sliding pin arranged in a bore of the other one of said mating surfaces, said sliding pin engaging said groove.

3. Sealing bolt according to claim 2, wherein said sliding pin is pushed into said groove by gravitational and/or spring force.

4. Sealing bolt according to claim 1, further comprising second entrainment means between said second shaft end of said bolt shaft and said second part.

5. Sealing bolt according to claim 4, wherein said second entrainment means is formed by an axial cavity in said bolt shaft for receiving an axial extension of said second part, wherein:
   said second shaft end comprises a first radial protrusion facing said axial extension of said second part;
   said axial extension of said second part comprises a second radial protrusion facing said second shaft end; and
   said first and second radial protrusions are arranged so as to engage each other after a predetermined rotation of said second shaft end with respect to said second part in said loosening direction.

6. Sealing bolt according to claim 5, further comprising at least one ultrasonic identity element.

7. Sealing bolt according to claim 6, wherein said ultrasonic identity element comprises a stack of disks with randomly arranged notches.

8. Sealing bolt according to claim 1, wherein said breakable integrity element comprises an ultrasonic identity element.

9. Sealing bolt according to claim 8, wherein said ultrasonic identity element comprises a stack of disks with randomly arranged notches.

* * * * *